US010226053B2

(12) United States Patent
Jacobsen et al.

(10) Patent No.: US 10,226,053 B2
(45) Date of Patent: Mar. 12, 2019

(54) METHOD AND DEVICE FOR MONITORING A MEAT PROCESSING MACHINE

(71) Applicant: Nordischer Maschinenbau Rud. Baader GmbH + Co. KG, Lubeck (DE)

(72) Inventors: Ulf Jacobsen, Bad Schwartau (DE); Henning B. Pedersen, Ikast (DK)

(73) Assignee: Nordischer Maschinenbau Rud. Baader GmbH + Co., KG, Lubeck (DE)

( * ) Notice: Subject to any disclaimer, the term of this patent is extended or adjusted under 35 U.S.C. 154(b) by 765 days.

(21) Appl. No.: 14/420,641

(22) PCT Filed: Jul. 31, 2013

(86) PCT No.: PCT/EP2013/066076
§ 371 (c)(1),
(2) Date: Feb. 9, 2015

(87) PCT Pub. No.: WO2014/023626
PCT Pub. Date: Feb. 13, 2014

(65) Prior Publication Data
US 2015/0216192 A1 Aug. 6, 2015

(30) Foreign Application Priority Data
Aug. 8, 2012 (DE) .................. 10 2012 107 278

(51) Int. Cl.
*A22C 17/00* (2006.01)
*A22C 25/00* (2006.01)
(Continued)

(52) U.S. Cl.
CPC .............. *A22C 17/00* (2013.01); *A22C 25/00* (2013.01); *A22C 25/16* (2013.01); *G05B 17/02* (2013.01); *G06F 17/10* (2013.01)

(58) Field of Classification Search
CPC ... A22C 17/00; A22C 17/002; A22C 17/0033; A22C 17/008; A22C 17/0086
(Continued)

(56) References Cited

U.S. PATENT DOCUMENTS 4,291,435 A    9/1981   Hartmann
5,184,733 A    2/1993   Arnarson
(Continued)

FOREIGN PATENT DOCUMENTS

CN    201341386 Y    11/2009
DE      4204843 A1    8/1992
(Continued)

OTHER PUBLICATIONS

Office Action dated Jun. 14, 2013 from German Patent Application No. 10 2012 107 278.7.
(Continued)

*Primary Examiner* — Richard T Price, Jr.
(74) *Attorney, Agent, or Firm* — David B. Tingey; Bryan J. Keller; Kirton McConkie

(57) ABSTRACT

The invention relates to a method for monitoring a meat processing machine having a meat processing unit for processing input meat products fed thereto into output meat products, an input sensor unit, and a control unit for controlling the meat processing unit, wherein the control unit is connected to the input sensor unit, comprising the steps: feeding input meat products to the meat processing unit, acquiring input product data, in particular geometric data and/or weight data, of the input meat product fed to the meat processing unit by means of the input sensor unit, and determining a tolerance variable for a yield-relevant processing parameter by means of a mathematical model or a database, in each case depending on the acquired input
(Continued)

Figure 1:
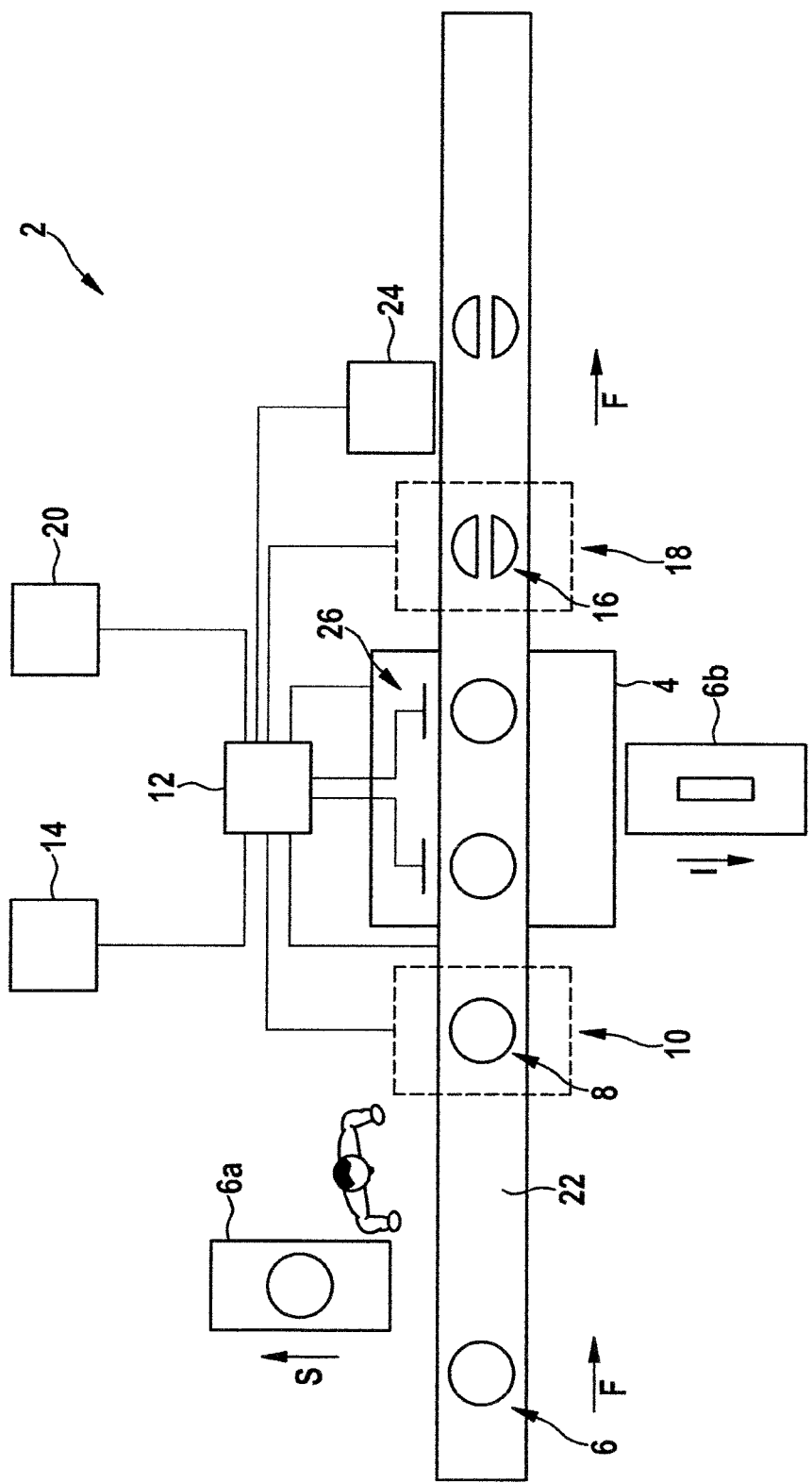

product data. The invention further relates to a meat processing machine for performing the method.

17 Claims, 2 Drawing Sheets

(51) Int. Cl.
    *A22C 25/16*     (2006.01)
    *G05B 17/02*     (2006.01)
    *G06F 17/10*     (2006.01)

(58) Field of Classification Search
    USPC .......................... 452/198, 149, 150, 152–160
    See application file for complete search history.

(56) References Cited

U.S. PATENT DOCUMENTS

| | | | |
|---|---|---|---|
| 6,164,174 A | 12/2000 | Sigurdsson et al. | |
| 7,039,220 B2* | 5/2006 | Kriesel | A01K 29/00 |
| | | | 382/110 |
| 7,399,220 B2* | 7/2008 | Kriesel | A01K 11/008 |
| | | | 452/157 |
| 7,547,247 B2* | 6/2009 | Schimitzek | A22B 5/007 |
| | | | 452/157 |
| 7,591,718 B2* | 9/2009 | Crane | A22B 5/0064 |
| | | | 452/52 |
| 7,828,639 B2* | 11/2010 | Nielsen | A22B 5/0064 |
| | | | 452/198 |
| 8,147,299 B2* | 4/2012 | McKenna | A22B 5/007 |
| | | | 452/155 |
| 8,348,144 B2* | 1/2013 | Thorsson | G06Q 10/08 |
| | | | 235/375 |
| 8,584,867 B2* | 11/2013 | Gould | A22C 17/002 |
| | | | 209/552 |
| 8,808,068 B2* | 8/2014 | Stooker | A22C 21/0076 |
| | | | 452/125 |
| 8,862,262 B2* | 10/2014 | Thorsson | A22C 17/0093 |
| | | | 452/150 |
| 8,968,059 B2 | 3/2015 | Grimm et al. | |
| 2006/0171581 A1 | 8/2006 | Blaine | |
| 2007/0193425 A1 | 8/2007 | Weber | |

FOREIGN PATENT DOCUMENTS

| | | |
|---|---|---|
| DE | 102006007490 A1 | 8/2006 |
| KR | 102011004995 A | 5/2011 |

OTHER PUBLICATIONS

Examination Report dated Dec. 17, 2015 from Chinese Patent Application No. 201380040360.8.
International Preliminary Report on Patentability dated Feb. 10, 2015 from International Patent Application No. PCT/EP2013/066076 filed Jul. 31, 2013.
International Search Report dated Apr. 15, 2014 from International Patent Application No. PCT/EP2013/066076 filed Jul. 31, 2013.

* cited by examiner

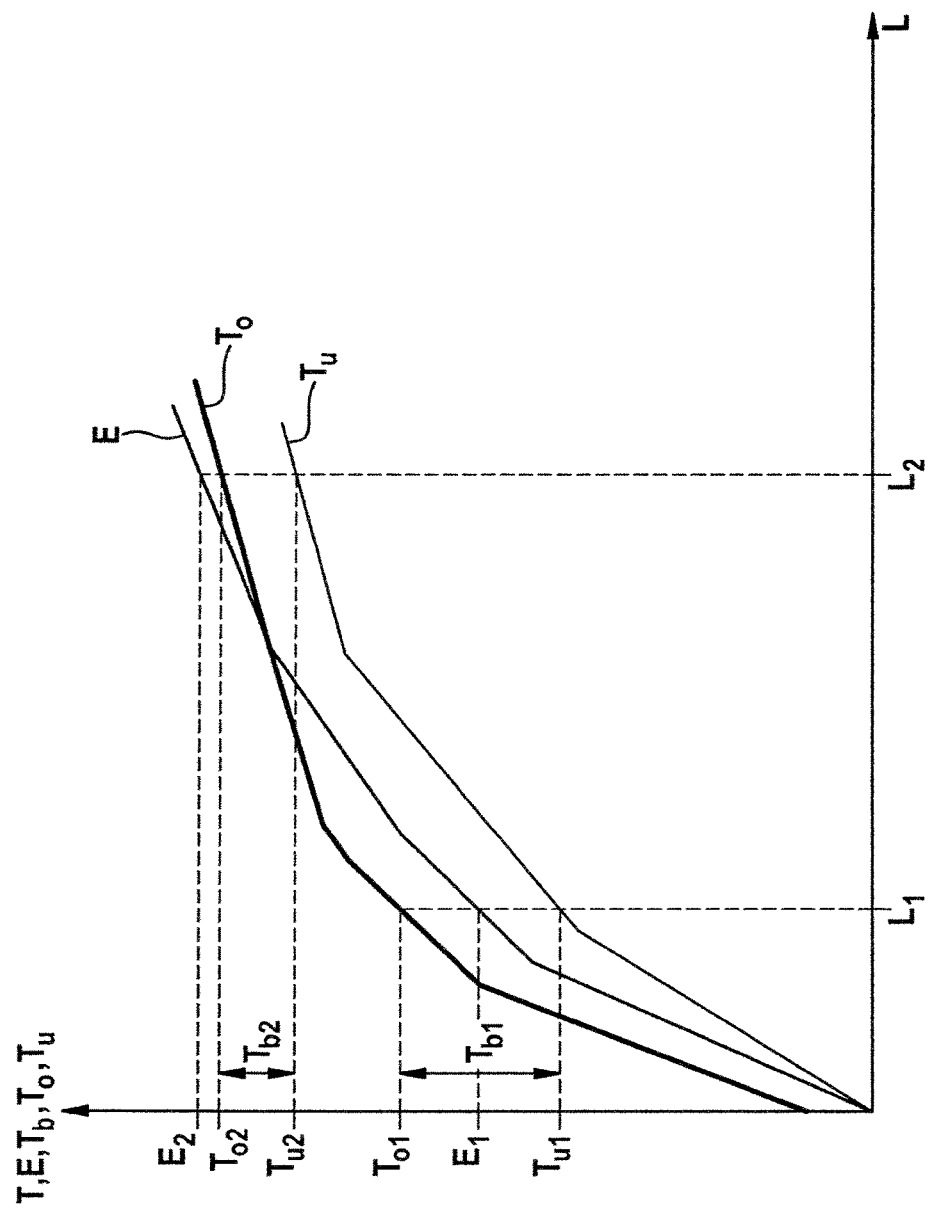

METHOD AND DEVICE FOR MONITORING A MEAT PROCESSING MACHINE

The invention relates to a method for monitoring a meat processing machine with a meat processing unit for processing input meat products fed thereto, an input sensor unit and a control unit for controlling the meat processing unit, wherein the control unit is connected to the input sensor unit.

The invention further relates to a meat processing machine for processing meat with a meat processing unit for processing input meat products fed thereto, an input sensor unit and a control unit for controlling the meat processing unit, wherein the control unit is connected to the input sensor unit.

Such apparatuses and methods are used in various branches of the meat processing industry, particularly the fish processing or poultry processing industry, in which unprocessed or also partially preprocessed meat products are processed automatically. Animal carcasses or at least parts of animal carcasses, particularly poultry, fish, pigs, cows and/or the like can be considered as meat products. Thus, meat products can for example be fish bodies or poultry bodies. In principle, meat processing units can process meat products of different categories, shapes or weight ranges. The meat processing machine can also comprise a plurality of meat processing units for this purpose. The respective meat processing unit is adapted appropriately in each case for the different meat products still to be processed. For this purpose, the meat products still to be processed are measured, particularly the height, width and/or length thereof. The machine parameters of the meat processing unit are set according to results of these measurements. Thus, for fish processing units, the blade spacings can be set for belly blades, side blades or back blades depending on the body height of the fish still to be processed. Typically, such settings of the meat processing unit, such as the blade spacings for example, are called the machine parameters. If the machine parameters are set to the meat product to be processed, then the meat product is subsequently processed by the meat processing unit. Last but not least, the processed meat products are measured after the processing for marketing. Thereby, preferably the length, width, height and/or the weight of the meat product are measured.

For improved understanding of the invention, in the following the meat product fed to a meat processing unit is designated as the input meat product. Due to processing, along with the meat products that are to be utilized or acquired, often further meat products also result that are not to be utilized. Subsequently, the portion of the processed meat products that is intended to be utilized or acquired by means of the meat processing unit, is designated as the output meat product. The remaining portion of the processed meat product is designated as the carrier product and/or the trim. The carrier product here does not necessarily serve as a carrier for the output meat product. Rather, the carrier product can also comprise entrails or other parts.

For processing fish, the meat processing unit can be designed as a fish processing unit, in order to separate the filleted flesh from the fish bones of a fish body fed to the fish processing unit. In this case, the input meat product would be the fish body. The output meat product would be the filleted meat yielded in the process. The remaining part of the fish body would be the carrier product, or respectively, the trim.

A method and an apparatus for determining the volume, the shape or the weight of fish, or other objects, are known from DE 4204843 A1. According to this, for determining the volume, shape or the weight of fish, for each fish, which is initially transported on a conveyor belt, a series of images of the contour of the fish is taken using a camera. Then, the volume of the fish, or the weight thereof is calculated using a microprocessor on the basis of the received image data. A composite picture of the fish with many cross-sections arises from the image series from the camera, wherein the width and the maximum thickness of the respective fish are measured in each cross-section. The volume of the fish is obtained by multiplying the cross-sectional regions by the speed of the conveyor belt and the time between the individual images. The weight of the fish is obtained by multiplying the volume by the specific weight of the type of fish to be weighed.

It is also known from the prior art to use sensors for measuring the fish products to be processed before the processing thereof, and from this sensor data to draw conclusions regarding the volume or the weight of the fish to be processed.

Furthermore, it is known that the output meat product is measured in order to draw conclusions about the weight of the output meat product. However, no statement can be made as to whether the output meat product corresponds to that portion of the input meat product which could have been acquired by means of the meat processing unit, or whether it deviates, and to what extent. Rather, often only measured data of the input meat product and/or the output meat product are acquired.

For clarification, the problem is explained using the following example. A meat fillet (here, the desired output meat product) can be separated from the bones, or fish bones, of the input meat product using the meat processing unit. The separation occurs, however, only to a certain degree. More often than not, residual meat still remains on the bones, or fish bones, such that a complete separation occurs only in rare cases. The completeness of the yield of the input meat product depends, however, on various factors. On the one hand, there is the structure of the fish itself, and on the other, the structure and design of the meat processing unit. If, due to physical limitations, the meat processing unit cannot completely separate the previously named fillet meat from the bones, or fish bones, of the input meat product, even in the case of optimal settings, this does not represent a fault of the meat processing unit. Therefore, from the knowledge of the input meat product and the output meat product processed therefrom, it is difficult to make a statement as to whether there is an incorrect setting for the meat processing unit or another error of the meat processing machine.

Therefore, the object of the invention is to create a method and an apparatus with which the results of processing of meat products by means of a meat processing machine, or respectively a meat processing unit, can be monitored objectively.

The object is solved by a method for monitoring a meat processing machine with a meat processing unit for processing input meat products fed thereto into output meat products, an input sensor unit, and a control unit for controlling the meat processing unit, wherein the control unit is connected to the input sensor unit, comprising the steps: feeding input meat products to the meat processing unit, acquiring input product data, in particular geometric and/or weight data, of the input meat products fed to the meat processing unit by means of the input sensor unit and determining a tolerance variable for a yield-relevant processing parameter by means of a mathematical model or a database, in each case depending on the acquired input product data. A yield-relevant parameter can be understood to be a variable representing the processing. This relates particularly to the yield and/or bone portion of the output meat product that is obtained by the processing, and/or the cutting accuracy and/or processing accuracy that can be obtained by the processing. The yield-relevant processing parameter can alternatively or additionally be understood to be a variable representing the output meat product. This relates particularly to the weight of the respective output meat product that can be obtained through processing, and/or a geometric variable that can be attained through processing, such as the length, width and/or the height of the output meat product for example.

As explained at the outset, the input product data of an input meat product and/or the output product data, in particular the geometric and/or weight data, of an output meat product are hardly suitable as such for the purpose of an error-free assessment of the processing quality. However, by considering a mathematical model and/or a database that can be used in combination with the acquired input product data to determine a tolerance variable for a yield-relevant processing parameter, it is possible to monitor the meat processing machine, or respectively the meat processing unit, overcoming the initially presented disadvantages. Applying acquired input product data to the mathematical model and/or the database allows reliable tolerance variables to be determined. This is because the anatomy of the fish and/or the structural design of the machine can be considered in the mathematical model and/or the database. The mathematical model is preferably understood to be at least one formula having at least one associated parameter. It is particularly preferable if the mathematical model is represented by at least one linear and/or nonlinear function, in each case having at least one associated parameter. The mathematical model can be an analytical model or an empirical model. Therefore, it is also possible that the mathematical model is represented by a neural network. A neural network is understood to be a network of artificial neurons. The neurons can be disposed in the layers lying behind one another, each of which preferably forms a trainable neural layer of the neural network. Thus, the acquired input product data is used for adapting the mathematical model, particularly the associated parameters, and for correspondingly determining the tolerance variable and/or for selecting and/or assigning the correct tolerance variable from the database. Thus, it is the combination of the latter information that represents the advantage of the tolerance variable. The tolerance variable can serve for evaluating the yield-relevant processing parameter, and therefore also for monitoring the processing, or respectively the meat processing machine and/or the meat processing unit.

An advantageous design of the method is distinguished in that the processing parameter is the yield of the processing. In practice it has been shown that the yield of the processing is particularly relevant. The yield is preferably the weight of the output meat product. However, the yield can also be a geometric variable of the output meat product, particularly the length, width and/or height of the output meat product.

A further advantageous design of the method is distinguished in that a tolerance range, an upper tolerance value and/or a lower tolerance value, is determined as a tolerance variable for the processing variable. Although for the most part, the tolerance variable is preferably a tolerance range, there is however also the case in which a one-sided range limit is sufficient. For monitoring for example, it is particularly relevant that the output meat product has a specific length, and a lower tolerance value is sufficient and advantageous for this purpose. If it is essential that the output meat product fits into a packaging tray with a maximum length for later marketing and/or is adapted for other comparable application purposes, it can be advantageous that the tolerance variable is an upper tolerance value. However, most of the time, it is advantageous if the tolerance variable is a tolerance range with an upper tolerance value and a lower tolerance value. In this case, the stated advantages can be combined.

A further advantageous design of the method is distinguished in that the method steps for the input meat products fed to the processing unit are performed on a random basis or periodically with a predefined periodicity. If the method, or respectively the method steps, is performed for each input meat product fed to the input processing unit, this can be called an individual meat product monitoring. In this case, the monitoring can be very accurate. If an error and/or other deviations and/or an unexpected disruption occurs, the triggering state can be traced back to the respective meat product and/or the settings, or respectively machine parameters of the machine. Therefore, it is possible to easily and efficiently optimize the meat processing machine and/or the meat processing unit. However, it is also possible that the method and/or the method steps are performed on a random basis or periodically with a predefined periodicity. In this case, the associated expenditure for determining the tolerance variable is reduced. If the method is performed aided by a computer, only a small computational effort is required.

A further advantageous design of the invention is distinguished in that the tolerance variable is assigned at least one value from the database depending on the input product data, or depending on the input product data and machine parameters, where tolerance variables depending on input product data, or on input product data and machine parameters, are stored in the database. The variables and/or data stored in the database are preferably predefined, or can be predefined for this purpose. The database can be a standard database which is adapted for processing the respective category, shapes, and/or weight ranges of input meat products. The tolerance variable to be determined is then assigned at least one value from the database depending on the actually acquired input product data, and/or the actually acquired input product data and the actually existing machine parameters. The value selected for the tolerance variable is the value from the database corresponding to the actually acquired input product data and/or machine parameters. In other words, a comparison is performed here based on the input product data and/or machine parameters, and an assignment of the corresponding tolerance variable. Information that is known about the meat products and/or machine settings can be anchored in a plurality of combinations of input product data and/or machine parameters in the database. This known information can be used for the purpose of selecting a corresponding tolerance variable. This can occur rather quickly due to the abundantly available computing power. As long as the quantization steps are selected to be sufficiently small, the tolerance variables can also be selected correspondingly precisely. If specific combinations of input data and/or machine parameters are not covered by the database, these can be determined by interpolation or extrapolation.

A further advantageous design of the method is distinguished in that the tolerance variable is calculated from the input product data by means of a morphology model as the mathematical model. Alternatively or additionally, the method can be developed in the manner that the tolerance variable is calculated from the input product data and machine parameters by means of a morphology model and a machine model together as the mathematical model. The morphology model is preferably understood to be a mathematical model that is represented by a mathematical formula and parameters, for example, of at least a part of the type of the input meat product. The morphology model is represented particularly preferably by at least one linear and/or nonlinear function, in each case having at least one associated parameter. The morphology model can be an analytical or empirical model. Thus, it is also possible that the morphology model is represented by a neural network. The acquired input product data serves for adapting the morphology model, particularly the associated parameters. If salmon are to be processed by means of the meat processing machine for example, then a mathematical model of at least one part of the salmon, preferably of the deheaded salmon body is used as a morphology model. The morphology model can be as detailed as desired. Thus, the model can map the entire shape of at least one part of the salmon to be processed (here, the input meat product). However, it is also possible that the morphology model comprises a mathematical model of the fish bone structure and the fillet meat, particularly the volume, geometry, and/or position on, or at, the fish bone structure. The machine model is preferably understood to be a mathematical model that is represented by mathematical formulas and parameters, of at least a part of the machine. The machine model can also be a model of at least a part of the machine. Particularly preferably, the machine model is represented by at least one linear and/or nonlinear function, each having at least one associated parameter. The machine model can be an analytical or empirical model. Therefore it is also possible that the machine model is represented by a neural network. The machine parameters serve therefore for adapting the machine model, particularly the associated parameters. The morphology model and/or the machine model can serve together as the mathematical model. For this purpose, the morphology model and/or the machine model can be connected together mathematically, particularly functionally. In addition, the tolerance variable can be determined very quickly due to the abundantly availably computing power. An advantageous design is distinguished in that the tolerance variable is calculated, or respectively determined, by the meat processing unit already before the processing of the input meat product. The mathematical model is further distinguished by the low storage requirements. Furthermore, the so-called corpulence factor is considered for the mathematical model. This is known in the field of processing meat bodies.

A further advantageous design of the method is distinguished by the following steps: tracking input meat products, acquiring by means of an output sensor unit of the meat processing machine output product data, in particular geometric data and/or weight data, of the respective corresponding, in particular yield-relevant output meat product fed away from the meat processing unit, wherein the control unit is connected to the output sensor unit, and determining the yield-relevant processing parameters depending on the input product data and the output product data corresponding thereto, particularly by calculating the difference or calculating the ratio. Tracking meat products, particularly the input meat products and/or the output meat products makes it possible to correlate or combine the information acquired here for this purpose, particularly the input product data, and respectively the output product data. Thus, a yield-relevant processing parameter can be determined that characterizes the processing. The output product data can also represent the yield-relevant parameters. However in practice, it has proven to be advantageous if the yield-relevant parameter is determined depending on the input product data and the output product data corresponding thereto. This is also possible due to the tracking. The determination is made by calculating the difference and/or calculating the ratio, particularly of the values of this data that are related to each another. Furthermore, it is preferable that the yield-relevant processing parameter is compared to the associated, or respectively corresponding, tolerance variable. Thereby it is possible to make an objective statement about the processing, particularly the processing quality and/or the status thereof. This can pertain to an error and/or an impermissible deviation.

A further advantageous design is distinguished by issuing a warning signal by means of an acoustic and/or optical output unit if the determined processing variable is outside of the tolerance range, and/or a status signal using the acoustic and/or optical output unit, if the determined processing variable is within the tolerance range. Thus, a warning signal is issued if the actual processing variable exceeds an associated tolerance range. This warning signal can indicate an error and/or a fault in the meat processing machine, or respectively the meat processing unit. If the meat processing machine, or respectively the meat processing unit is functioning correctly, the actual processing variable is within the associated tolerance range. In practice it has been shown that the operating personnel are also interested in this information. Therefore, it is preferable to issue a corresponding status signal.

A further advantageous design of the method is distinguished in that the value of the status signal is determined depending on a deviation between the determined processing parameter and one of the range limits of the tolerance range. By issuing such a status signal, the optimization potential and/or the optimization as such of the meat processing machine is continuously indicated to the operating personnel.

A further advantageous design of the method is distinguished by the following steps: specifying a tolerance variable for the processing parameter corresponding to the acquired input product data, or determining the tolerance variable by means of the processing parameter corresponding to the acquired input product data, determining a database parameter set comprising the input product data, the tolerance variable for the associated processing parameter and/or the machine parameter, and updating the database with the database parameter set. If an input meat product is processed by the meat processing unit into an output meat product and thereby it is recognized that this processing has been performed particularly well and correctly, then the acquired data, variables or parameters can be used for the purpose of updating and/or to refining, or respectively improving, the database. The processing parameters associated with processing that is particularly good, or to be considered for other reasons, can be used as a reference value for the tolerance variable. Thus, an associated tolerance variable can be given particularly easily. Alternatively, this processing parameter can serve also for calculating the tolerance variable. Thereby, a tolerance range, an upper tolerance range and/or a lower tolerance range (in each case for the database) can be determined by adding, or respectively subtracting, a value that can be predetermined. A database parameter set is composed then from the acquired input product data, the determined and/or specified tolerance variables and/or the corresponding machine parameters. This database parameter set is used subsequently for updating the database. Thus, it is possible to further supplement the database also during processing and/or subsequently, in order to improve the quality of the monitoring.

A further advantageous design is distinguished in that the database is updated if the processing parameter is within the tolerance range. In this case it can be assumed that the tolerance range can be further reduced in order to increase the accuracy of the monitoring. It can also be provided that the database is updated if the processing parameter is outside of the tolerance range. This occurs particularly if multiple successive processing parameters are outside of the tolerance range. In this case it can be assumed that the tolerance range is dimensioned too narrowly, and results therefore in an erroneous evaluation of the processing. Then, the tolerance range would be increased. Correspondingly, the tolerance variable can also apply for the one-sided range limit. Thus, it is possible that the database is updated if the processing parameter is less than or greater than the upper tolerance value, or if the processing variable is less than or greater than the lower tolerance value.

A further advantageous design of the method is distinguished by a setup mode of the meat processing machine comprising the following steps: a new setting of the database parameters with a preset sample parameter dataset, and feeding reference meat products as input meat products to the meat processing unit. If the meat processing machine is setup for previously unknown meat products, there is no database that can be referred to. Therefore it is provided to supply previously selected meat products which were designated here as a reference meat products for example, to the meat processing unit as input meat product. These reference meat products can be previously measured and the meat processing unit can be particularly well adapted to these meat products so that it can be assumed that the meat processing unit processes these reference meat products particularly well. By means of the data and/or variables acquired by this processing, a corresponding database can be built and/or expanded in order to use this database for the further operation of the meat processing machine and/or the meat processing unit.

A further advantageous design of the method is distinguished by registering each of the fed input meat products, if the input product data thereof is outside of a preset product data tolerance range for input meat product to be fed. Alternatively, or additionally, the method is also distinguished by registering each of the output meat products, if the output product data thereof is outside of a preset product data tolerance range for output meat product to be fed out. The registering of specific input and/or output meat products serves to characterize oversize and/or undersize variables of properties, relative to each input or output meat product, and to enable this information to be used for the further processing. If an oversized input meat product, for example, is fed to the meat processing unit, of which it is known that the meat processing unit is not suited for the purpose of processing such oversized meat products, then it can be predicted that incorrect processing will result. The same applies to thus characterized output meat products.

A further advantageous design of the method is distinguished in that the warning signal and/or status signal is issued for a registered input and/or output meat product with a preset marking. The registering, stated above, can also be used to indicate such input and/or output meat product, by means of a warning and/or status signal, to the operating personnel. Even if the meat processing machine and/or the meat processing unit has not correctly processed the input meat product into the output meat product that is theoretically possible, due to the registration it is possible that the operating personnel are informed that such a processing does not represent a machine error. It is rather due to the fact that the meat processing machine was fed with an input meat product that was not suitable for processing by such a machine. In this case, the operating personnel do not need to perform a stop or undertake other adjustment measures. Moreover, processing can continue unimpeded. Thus, a meat processing machine operating in such a manner has particularly short outage times, and in economic terms, has particularly high efficiency.

A further advantageous design of the method is distinguished in that a database parameter set belonging to the registered input meat product is not considered when updating the database. As already mentioned, a registered input meat product is not suited to be processed correctly by the meat processing unit. Thus, it is also not meaningful for such an input meat product to be considered when updating the database, because otherwise this could lead to a degradation of the information content and/or prediction quality of the tolerance variable.

The initially named object is further solved by a meat processing machine for meat processing having a meat processing unit for processing of the input meat products fed thereto into output meat products, an input sensor unit, and a control unit for controlling the meat processing unit, wherein the control unit is connected to the input sensor unit, and wherein the meat processing machine is equipped and/or designed for performing the method according to one of the previously described preferred designs. The advantages resulting therefrom were already explained in the context of the method, so that for avoiding repetition reference is made to corresponding passages.

Further advantageous features of the invention will become apparent from the description of the embodiments according to the invention together with the claims and/or the included drawings. The embodiments according to the invention can fulfill, or respectively represent, individual features or a combination of multiple features. The invention is described below, without restricting the general intent of the invention, based on an exemplary embodiment in reference to the drawings. The drawings show:

FIG. 1 a schematic top view of an apparatus for monitoring a meat processing machine, and FIG. 2 a graphic representation of yields to be expected and corresponding tolerance variables depending on the respective lengths of the input meat products fed to the meat processing unit.

The features described in the following represent possible further developments, wherein the features can be configured individually or in combination with each other and/or with the previously named features. In addition, in the following figures, the same or similar types of elements or corresponding parts are provided with the same reference numbers so that a corresponding re-introduction can be omitted.

It must be pointed out that in general, depending on the conditions, the method according to the invention can also be implemented in software. The implementation can be in digital storage media using electronically readable control signals that can interact with a programmable computer system so that the appropriate method is performed. Thus, in general the invention also comprises a computer programme with a programme code for performing the method according to the invention stored on a machine readable carrier, if the computer programme runs on a computer. In other words, the invention is therefore realized as a computer programme with a programme code for performing the method, if the computer programme runs on a computer.

Referring to the schematic representation of FIG. 1, the invention relates to a method for monitoring a meat processing machine 2 with a meat processing unit 4 for processing an input meat product 8 fed thereto, an input sensor unit 10 and a control unit 12 for controlling the meat processing unit 4, wherein the control unit 12 is connected to the input sensor unit 10, comprising the following steps: feeding input meat products 8 to the meat processing unit 4, acquiring input product data L, by means of an input sensor unit 10, in particular geometric data and/or weight data, of the input meat products 8 fed to the meat processing unit 4, and determining a tolerance variable T for a yield-relevant processing parameter V by means of a mathematical model and/or a database 14, each depending on the acquired input product data L.

Thus, a meat processing machine 2 is monitored by means of the method according to the invention. The meat processing machine 2 comprises the meat processing unit 4 for this purpose. Input meat products 8 are fed to the meat processing unit 4 in order to be processed by the meat processing unit 4. The processing as such by means of a meat processing unit 4 is known from the prior art. Thus, by using at least one blade, for example, the meat processing unit 4 cuts the input meat product 8, particularly filleting the product.

A conveyor element 22, particularly a conveyor belt 22, is provided for feeding meat products 6 to the meat processing unit 4. The conveyor element 22 conveys meat products 6 in the direction of conveyance F. It has proven to be advantageous to perform a quality control and/or a visual control of the conveyed meat products 6 before a meat product 6 reaches the input sensor unit 10. This can also be performed using human intervention. Meat products 6 that do not meet predefined conditions can be rejected. These meat products 6a can be removed and/or rejected from the conveyor element 22, particularly in a lateral direction S.

If a meat product 6 reaches the input meat sensor 10 and/or an input region of the meat processing unit 4, this meat product 6 is designated as an input meat product 8. Thus, the input meat product 8 is fed to the meat processing unit 4 also by means of the conveyor element 22. The conveyor element 22 can be connected to the control unit 12 for this purpose.

Basically, the control unit 12 serves for controlling the meat processing unit 4. If the control unit 12 is also connected to the conveyor element 22, the control unit 12 can also serve for controlling the conveyor element 22 or the meat processing machine 2. A position unit and/or a speed sensor unit can be associated with the conveyor element 22 for the purpose of determining, in the control unit 12, the respective position of a meat product 6 or an input meat product 8. Furthermore, the control unit 12 is connected to the input sensor unit 10. The input sensor unit 10 serves for acquiring input product data L of the input meat products 8 fed to the meat processing unit 4. In particular the geometric data and/or weight data are acquired by the input sensor unit 10 as input product data L. Thus, the length, width, height and/or the weight, for example, of the respective input meat product 8 can be acquired by means of the input sensor unit 10.

The acquired input product data L is also available to the control unit 12 due to the connection between the input sensor unit 10 and the control unit 12.

The input sensor unit 10 can be a contactless or a contact-based sensor unit. If the sensor unit 10 is contactless, the unit does not come into contact with the input meat product 8. The input sensor unit 10 can comprise at least one optical sensor means, particularly at least one light beam and/or at least one camera, at one least x-ray unit and/or at least one ultrasound unit. Furthermore, the input sensor unit 10 can comprise data preprocessing that processes the acquired signals and converts them into values and/or signals representing the physical variables.

After acquiring the input product data L of the fed input meat products 8, these products are processed by the meat processing unit 4. If salmon is fed, for example, by means of the conveyor element 22 to processing unit 4, the processing can consist of the so-called trimming the fillet side edges. The so-called trim 6b, that is, the part separated from the salmon fillet can be rejected in a lateral direction I. The processed meat product (in this case, the meat product separated from the trim 6b) processed by the meat processing unit 4 into the output meat product 16 is fed out of the meat processing unit 4. This can also occur by means of the conveyor element 22 in the direction of conveyance F. The invention, however, is not limited to such processing. Thus, the processing by means of the meat processing unit 4 can alternatively and/or additionally comprise removal of fish bones, bones and/or other parts of the input meat product 8. It can also be provided that the input meat product 8 is impacted in another manner mechanically and/or by energy.

Furthermore, a tolerance variable T for a yield-relevant processing parameter V can be determined by means of a mathematical model and/or a database, wherein in each case the determination is made depending on the acquired input product data L. Using the tolerance variable T it is possible to make a statement not only about the efficiency of the meat processing machine, but rather also whether the meat processing unit 4 could have better processed the input meat product 8, and/or whether the meat processing unit 4 has incorrect settings, and/or whether the meat processing unit 4 is generally not working correctly.

A yield-relevant parameter V can be understood to be a variable representing the processing. This relates in particular to the yield that can be obtained due to the processing, and/or the portion of bone of the output meat product 16, and/or the cutting accuracy and/or processing accuracy that can be obtained by the processing.

Alternatively or additionally, a yield-relevant parameter can be understood to be a variable representing the output meat product 16. This relates particularly to a weight of the respective output meat product 16 that can be obtained due to the processing, and/or a geometric variable, preferably the length, width and/or the height of the output meat product 16 that can be obtained due to the processing.

The processing parameter V can also relate to a part of the meat product, thus particularly the input meat product 8 and/or the output meat product 16, and/or to a property of the input meat product 8 and of the output meat product 16 corresponding to each other, in each case.

In addition, it is provided that the yield-relevant processing parameter V relates to the part of the processing parameter V for which the yield is relevant. In other words, the yield-relevant processing parameter V can be understood to be a variable that characterizes the processing of the meat processing unit 4 relevant for the yield, and/or part of the output meat product 16 relevant for the yield.

The tolerance variable is a variable, particularly a value and/or a value set, that specifies a "permissible" value range for the yield-relevant processing parameter.

The advantages according to the invention are explained in the following based on an example: filleted meat (here, the desired yielded meat product 16), for example, can be separated by the meat processing unit 4 from the bones and/or fish bones of an input meat product 8 (a fish in this example). However, the separation occurs only to a certain degree. In practice it was determined that meat residual still remains on the bones, or fish bones, so that a complete separation did not result. Therefore, the yield describes that meat product portion which should be separated from the remaining input meat product 8 to be processed by the meat processing unit 4. The absolute yield can be the output meat product 16, thus here, the separated fish fillet, for example. The relative yield can be the ratio of the output meat product 16 to the input meat product 8. Here, the output meat product 16 is preferably understood to be the part of the meat product 6 to be processed that is to be yielded and/or acquired. It is also preferred that the remaining part of the respective meat product 6—thus, in the example, the bones, fish bones and/or other trim—is not considered as output meat product 16. In practice it has been determined that it is not unusual to attain relative yields particularly significantly less than 80%. On the one hand, this can be ascribed to the prior explanations. In addition, there are particularly high demands on the meat processing unit 4 due to the plurality of categories, lengths, sizes and/or heights of an input meat product 8. However, not every meat processing unit 4 is equally suited for processing various categories and/or shapes of input meat products 8 in the manner that results in uniformly high, particularly relative, yields. Frequently it is necessary to adjust the machine parameters of a meat processing unit 4 to the respective input meat product 4 to be processed. In doing so, the machine parameters are subject to construction-dependent limits. Thus, it was determined in practice that meat processing units 4 are designed in a manner that they can process fish with a body height from a specific body height range with particularly good results, in the sense of yield. Now, if fish, for example, with the same body height is processed by this meat processing unit 4, it is still however possible that a different yield is attained in each case. This can be due to the fact that the fish are fish with the same body height that are narrow and long, or short and wide, or of average length and average width. A plurality of shapes are conceivable between these extremes, and these shapes exist in practice. Due to differently formed shapes of the fish in each case, or respectively the input meat product, to be processed, it is often not possible, or only barely possible for the meat processing unit 4 to process the input meat product 8 to be processed in a uniformly good manner, that attains the maximum yield in each case. This is particularly true for processing fish. Here, it could be determined in practice that the processing blades of a meat processing unit 4 (here, preferably a fish processing unit) cannot follow each contour of the fish skeleton of a fish to be processed (as the input meat product 8). Therefore, residual meat still remains on the fish bones. This leads to an absolute yield as well as a relative yield that are considered poor and/or not optimal. However, this is not an error of the meat processing machine 2 and/or the meat processing unit 4 when fish, for example, with the same body height can be processed by the same meat processing machine 2, or respectively the meat processing 4, and have different relative and/or absolute yields. Therefore, a tolerance variable, which specifies a "permissible" value range for the yield-relevant processing parameter, is advantageous. For the preceding example, this is a tolerance variable for the (relative and/or absolute) yield. In practice, it was determined that the meat processing machine 2, or respectively the meat processing unit 4, cannot always be properly monitored with a static, or respectively fixed, tolerance variable T. Thus, it was determined that a static tolerance variable T, which can be suitable for input meat products 8 with a low weight, to monitor the meat processing machine 2, or respectively the meat processing unit 4, can however be unsuitable for input meat products 8 with a higher or significantly higher weight, in order to correctly monitor the same meat processing machine 2, or respectively the meat processing unit 4. With the processing of input meat products 8 with the higher weight, the "permissible" value range for the yield-relevant processing parameter V determined by the static tolerance variable T, was exceeded, or fell below, such that an error was detected in the meat processing machine 2, or respectively the meat processing unit 4. However, upon more careful consideration, it was determined that the yield-relevant processing parameter V had an acceptable value, but that the "permissible" value range determined by the static tolerance variable T was defined too small, or respectively too narrow. Therefore, it is advantageous if the tolerance variable T is determined, or specified, for the yield depending on the weight of the respective input meat product 8. Thus, for input meat products 8 of different weights, a corresponding number of different tolerance variables T can be provided. It was further determined that not only the weight, but rather also other physical variables of the input meat product 8 influence the processing, and thus have a "permissible" value range. Therefore, it is provided to use acquired input product data L of the respective input meat products 8 to specify, or respectively determine, the respective associated tolerance variable T. This occurs by means of a mathematical model or a database 14. Thus, the acquired input product data L are used, for example, to set the respective corresponding parameters of a mathematical model so that with this mathematical model the corresponding tolerance variable T can be determined for the yield-relevant processing parameter V. A similar determination can take place by means of the database 14. The acquired input product data L determines which value is taken from the database 14 for the tolerance variable T, which then represents the tolerance variable T for a yield-relevant processing parameter V. The mathematical model and the database 14 can also be used together in combination.

Determining the tolerance variable T depending on the acquired input product data L effectively prevents the previously named errors in the monitoring of the meat processing machine 2, or respectively the meat processing unit 4. The acquired input product data L then allows the tolerance variable T to be adapted to the respective input meat product 8. Therefore, now if a multiplicity of fish with the same body height are to be processed by the meat processing machine 2, or respectively the meat processing unit 4, wherein the fish have different lengths, widths, and/or weights, the tolerance variable T is advantageously, dynamically adapted to the input meat products 8. However, this does not necessarily mean that the "permissible" value range for the respective yield-relevant processing parameter V is enlarged. Rather, the "permissible" value range can be reduced and/or shifted, specifically into the range in which the yield-relevant processing parameter V is expected. In other words, the tolerance variable T for a yield-relevant processing parameter V can be predicted depending on the acquired input product data L and by means of a mathematical model and/or the database 14. Thus, the processing variable T can be determined before, during and/or after the processing of the input meat product 8.

After the processing of the fed input meat products 8 into the output meat product 16, it is preferable to check and/or to monitor whether the yield-relevant processing parameter V is in the "permissible" value range specified by the tolerance variable T.

In practice it has further been determined to be advantageous to perform the following method steps: tracking the input meat products 8, and/or acquiring output product data, in particular geometric data and/or weight data, of the output meat product, particularly corresponding and/or yield-relevant output meat product, fed out of the meat processing unit 4, by means of an output sensor unit 18 of the meat processing machine 2, wherein the control unit 12 is connected to the output sensor unit 18, and/or determining the yield-relevant processing parameter V depending on the input product data L and the output product data G corresponding thereto, particularly by calculating the difference and/or calculating the ratio. This has the advantage that the output relevant processing parameter V is determined for associated meat products 8, 16. In order to enable this, meat products 6, particularly input meat products 8 and/or output meat products 16 are tracked. As already previously explained, the conveyor element 22 is preferably connected to the control unit 12. Alternatively and/or additionally, a motion sensor unit 24 can be provided for acquiring the movement of the conveyor element 22 and/or the conveyed meat products 6, 8, 16. If the conveyor element 22 is a conveyor belt 22 for example, the motion sensor unit 24 can acquire the speed of the conveyor belt 22. The motion sensor unit 24 is equipped and/or designed to acquire a position and/or speed variable of the conveyor element 22. Furthermore, it can be provided that the conveyor element 22 also has a corresponding motion sensor unit. The at least one motion sensor unit 24 is additionally connected to the control unit 12. If an input meat product 8 is detected by the input sensor unit 10, and if the speed of the conveyor element 22 with which the input meat product 8 is conveyed through the meat processing unit 4 is known, then in each case the position of the input meat product 8, or of the output meat product 16 produced by processing the input meat product 8 is also known. Furthermore, at least one process sensor unit 26 can be provided. Such a process sensor unit 26 can be comprised by the meat processing unit 4. The process sensor unit 26 can also be equipped and/or designed for acquiring geometric data and/or weight data of the respective meat product located in processing. The at least one process sensor unit 26 is preferably connected to the control unit 12. Therefore, all necessary information is available to the control unit 12 in order to track the input meat product 8 during feeding to the meat processing unit 4, during conveyance in the meat processing unit 4, and/or during conveyance from the meat processing unit 4. The tracking of input meat product 8 occurs therefore by means of the control unit 12, which for this purpose evaluates the movement of the conveyor element 22 and determines the position of the input meat product 8, or the corresponding output meat product 16, by evaluating the movement information, particularly the speed of the conveyor element 22, detected by the at least one motion sensor unit 24. Thus, each output meat product 16 can be associated with an input meat product 8. Here, the output meat product 16 is associated with the fed input meat product 8 from which it was processed. In the process, it is possible that several output meat products 16 arise from one input meat product 8. Thus, the same input meat product 8 can also be associated with several output meat products 16. In other words, at least one output meat product 16 corresponds to an input meat product 8. The same applies for the acquired product data L, G. The output product data G, acquired by means of the output sensor unit 18, of the at least one output meat product 16 corresponds to the input product data L of an input meat product 8 acquired by means of the input sensor unit 10. Thus, the weight of an input meat product 8 can be measured for example. This can be a fish, for example, having a weight of 2 kg. The input meat product 8, or respectively the fish, is then processed by the meat processing unit 4 into the at least one output meat product 16. This can be, in the case of the fish for example, two fish fillets, each weighing 750 g. After processing, the output meat products 16 are measured by the output sensor unit 18 and the output product data G thereof is acquired. In the case of the fish fillets, this would be the weight of 750 g each for example. Furthermore, in this case, the weight of the respective fish fillet (750 g) would correspond to the weight of the fish (2 kg). The yield-relevant processing parameter, in particular the yield, could be determined by forming the ratio of the 2×750 g of the fish fillets to the 2 kg of the fed fish. Other means of determination or calculation are not excluded.

It has also been shown to be advantageous if the yield-relevant processing parameter V is the yield E of the processing. Basically, the meat processing unit 4 serves for processing the fed input meat products 8 into output meat products 16. The yield, as is represented for example also in FIG. 2 depending on input product data L, is in practice very significant. This is often decisive for the financial results that can be obtained with such a meat processing machine 2. Preferably, the yield is the absolute or relative yield as was previously explained.

FIG. 2 shows a further example of the tolerance variable T for the yield-relevant processing parameter V. The tolerance variable T is preferably a tolerance range Tb, an upper tolerance value To and/or a lower tolerance value Tu. The corresponding upper tolerance value To and the lower tolerance value Tu, and the yield E typically lying in between, are expressed depending on the input product data L (represented here as one-dimensional). The tolerance range Tb can be understood as the range that is between the upper tolerance value To and the lower tolerance value Tu. If, for example, the lengths L1, L2 are acquired as input product data L of two input meat products 8, then in each case an upper tolerance value To, a lower tolerance value Tu and/or an associated tolerance range Tb can be determined as the tolerance variable T for the lengths L1, L2. As previously explained, this determination is made using a mathematical model and/or a database 14. If the input meat products 8 are processed by the meat processing unit 4 into output meat products 16, and subsequently output product data G thereof is acquired by the output sensor unit 18, then the actual yield-relevant processing parameter V, particularly the yield E of the processing, can be determined by means of the control unit 12. In this manner, a yield E1 is determined for the first input meat product 8 with the length L1. The corresponding tolerance variable T, thus for example the upper tolerance value To1, the lower tolerance value Tu1, and/or the tolerance range Tb1 are also represented in FIG. 2. The yield E1 lies within the tolerance range Tb1. In addition, the yield E1 is less than an upper tolerance value To1 and/or greater than a lower tolerance value Tu1 Thus, the yield E1 would be a "permissible" value. Therefore, there is no error. The result with respect to the second input meat product, whose length corresponds to the reference number L2, is different. Here too, the corresponding yield E2 was determined similarly. The yield is greater than the associated lower tolerance value Tu2. However, the yield E2 is neither in the tolerance range Tb2, nor less than the upper tolerance value To2. Therefore, the yield E2 is outside of the "permissible" range. Thus, there is an error. This error was only detected however, because the tolerance variable T is adapted depending on the acquired input product data L. This is to be recognized, for example, by the fact that the tolerance range Tb2 is less than the tolerance range Tb1. If the tolerance range Tb2 had been exactly the same size as the tolerance range Tb1, the monitoring would have come to the conclusion that no error was present also for the second input meat product 8. However, the error cannot always be properly detected with one such static and/or fixed variable. This is true for the error detection in general for other evaluation parameters, such as the performance of the meat processing machine 2, and/or a deviation from an optimal yield.

A further advantageous design of the method according to the invention is characterized by issuing a warning signal by means of an optical and/or acoustic output unit 20, if the detected output relevant processing parameter V is outside of the tolerance range Tb. With reference to FIG. 2, this is the case for the input meat product 8 that corresponds to the yield E2, or respectively the length L2. The yield E2 is outside of the tolerance range Tb2. Therefore, the yield E2 is outside of the permissible range for the yield. The acoustic output unit 20 can be formed by a loudspeaker for example. The visual output unit 20 can be a monitor screen and/or a lamp for example. The warning signal indicates to the operating personnel that the processing of the associated input meat product 8 was not correctly processed.

A further advantageous design of the method according to the invention is distinguished by issuing a status signal if the determined process parameter V is within the tolerance range Tb. As before, the determined processing parameter V is the actual processing parameter V. Here too, it can be the yield E. In FIG. 2, such a yield variable is labelled E1 which belongs to the length L1 of a corresponding input meat product 8. The yield E1 is within the associated tolerance range Tb1. Thus, the processing occurs without errors, or rather as anticipated. The status signal can be issued similarly by means of the optical and/or acoustic output unit 20. Furthermore, it can be provided that the value of the status signal is set depending on a deviation between the determined processing parameter V, thus for example, the yield E1 and one of the range limits To1, Tu1 of the tolerance range Tb. The value of the status signal can be the volume of an acoustic output unit 20, for example. However, value of the status signal can also be the brightness, intensity, and/or color selection in the case of issuing the signal by means of an optical output unit 20.

A further advantageous design of the invention is distinguished in that the tolerance variable T is assigned at least one value from the database 14 depending on the input product data L or the input product data L and machine parameters, where tolerance variables T depending on input product data L or on input product data and machine parameters, are stored by the database 14. In a particularly advantageous design, the database 14 has a plurality of different combinations of the input product data, or respectively the input product data and machine parameters, where a corresponding tolerance variable T is stored in the database 14 for each combination of the input product data, or for each combination of the input product data L and machine parameters. If input product data L, in particular geometric data and/or weight data, are acquired, or respectively measured, by means of the input sensor unit 10, and preferably the machine parameters which are provided for processing the input meat product 8 are considered, then a comparison can be performed with the corresponding values from the database 14 such that exactly the same value(s) is found in the database and/or the dataset of the input product data L, or respectively input product data L and machine parameters are found in the database 14, which have, particularly on average, the smallest deviation to the values to be acquired. The tolerance variable T can then be assigned the value that is stored in the database corresponding to the determined parameters, or respectively dataset, for the tolerance variable T. In other words, the input product data L, or the input product data L and the machine parameters, are used in order to read a tolerance variable T from the database 14 that corresponds to the input product data L, and input product data L and machine parameters.

A further advantageous design of the invention provides that the tolerance variable T is calculated from the input product data L by means of a morphology model as the mathematical model. The morphology model can be a specific morphology model for the meat product 6 to be processed, particularly fish. The so-called corpulence factor (K factor, or KF) can be considered in the morphology model, particularly for processing fish. The K factor can be different for each fish, particularly for each fish category. Furthermore, a yield factor (AF) can be considered in the morphology model. For this purpose, the yield factor can be different and/or can be preset for each meat product to be processed. A simpler morphology model for determining the tolerance variable, particularly a lower tolerance value Tu, for a fish could be designed considering the previously named factors, and with the example assumption that the length L of the fed fish 8 represents the input product data, as follows:

$$Tu = (\text{length of the fish})^3 \times KF \times AF \div 100.$$

Basically, the corpulence factor and/or the yield factor can depend on the measured geometric data and/or weight data of the input meat product 8.

A further advantageous design of the method is distinguished in that the tolerance variable T is calculated from the input product data L and machine parameters, by means of a morphology model and a machine model together as the mathematical model. The morphology model here can be designed as previously explained. Basically, the machine parameters can be understood to be all or at least a part of the parameters for the setting of the meat processing machine 2, or respectively meat processing unit 4. With a meat processing unit 4, the parameters could be for example, the parameter which specifies the respective distance of at least one cutting tool, particularly the blade-distance of belly blades, side blades, back blades and/or separating blades, in the case of fish processing machines. If the outer cross sectional area (DA) of a fish to be processed is determined by the input sensor unit 10, and the outer cross sectional area of the fish skeleton (DI) is determined by a morphology model, and if, for example, the cutting blades of the meat processing unit 4 (here, preferably a fish processing unit) have a specific or variable blade-distance (MA), then a simple machine model can be designed as follows:

$$MF = \left\{ \begin{array}{ll} \left(\dfrac{DA - MA}{DA - DI}\right) & \text{for } DA > MA > DI \\ 0 & \text{otherwise} \end{array} \right\}$$

where MF represents the machine factor. The machine factor can also have influence with the consideration of the tolerance variable T. The tolerance variable T can therefore be determined from the input product data (particularly the respective length L) by means of the morphology model and the machine model, as follows:

$$Tu = L^3 \times KF \times AF \times MF \div 100.$$

Due to the input product data L, or respectively the geometric data and weight data of the input meat product 8 and by means of the morphology model and machine model, information that describes the adaption of the meat processing machine 2, or respectively the meat processing unit 4, to the input meat product 8 to be processed, can also influence the determination of the tolerance variable T.

A further advantageous design of the invention is distinguished in that the method steps according to the invention and/or advantageous method steps are performed for each input meat product 8 fed to the meat processing unit 4. For this purpose, the control unit 12 can have an appropriately adapted computing capability and/or corresponding components. It is thereby possible to monitor the meat processing machine 2, or respectively the meat processing unit 4, individually for each input meat product. Thus, any errors of the meat processing unit 4 can be assigned to the respective input meat product 8 and/or, due to the preferred tracking, to at least one output meat product 16. Thereby it is possible to optimize the meat processing machine 2 particularly efficiently. This is because the reasons can be analyzed based on the input meat product 8, or respectively the at least one output meat product 16, and the meat processing unit 4 can be set optimally for products of this type. An alternative design provides that the method steps according to the invention and/or advantageous method steps are performed on a random sample basis. An associated random sampling can be assigned to an input meat product 8 or several input meat products 8. The computing effort is thereby decreased. At the same time however, the accuracy for assigning an error to a specific input meat product 8 also decreases. A further design of the invention therefore performs the method steps according to the invention and/or advantageous method steps on a periodic basis with a preset periodicity. Such a periodicity has the advantage of lowering the computing performance for the control unit 12 and/or the components associated with it.

The prior section explained that the database 14 can be used in order to determine the tolerance variable T. The entries in the database 14 can be preset for this purpose, particularly ahead of time. In practice however it has been shown to be advantageous to use specific standard databases for specific meat processing units 4. These databases 14 can be filled with values that were tested and classified as reliable in order to provide similarly possible reliable results for the respective tolerance variable T. In practice however it has been shown that results for determining the tolerance variable T can be still further refined when the database 14 is updated during the processing and/or later for this purpose. An advantageous design of the method is distinguished therefore by the following steps: specifying a tolerance variable T for the processing parameter V corresponding to the acquired input product data L, and/or determining a tolerance variable T by means of the processing parameter V corresponding to the acquired input product data L, and/or defining a database parameter set comprising the input product data L and/or the tolerance variable T for the associated processing parameter V and/or the particularly associated machine parameters, and/or updating the database 14 with the database parameter set. If, for example, the input product data L of an input meat product 8 is acquired, and the meat product is subsequently processed by the meat processing machine 4 into at least one output meat product 16, where specific machine parameters were set for the meat processing machine 4, and subsequently the output product data G of the at least one output meat product 16 is acquired by means of the output sensor unit 18, then subsequently, an associated tolerance variable T can be determined, particularly by means of manual input. Further, by using the output product data G and the input product data L, an associated processing parameter V can be determined particularly by calculating the difference and/or calculating the ratio. Thereby, a plurality of values are known to be associated to each other for a processing step. These associated values, or a part of the values, can form a database parameter set. It is therefore possible that the database parameter set comprises the input product data L, the output product data G, the processing parameter V, the machine parameter and the tolerance variable, or a partial quantity of the terms mentioned before. Updating the database with the database parameter set can mean to create a new and/or to overwrite an existing database parameter or database parameter set.

However, it is not always expedient to update. If the processing led to a poor result, for example, because while separating the fillet meat, a bone and/or a fish bone was cut or cut off, and this part of the bone, or respectively fish bone, remains on the fillet meat, it would not be advantageous to update the database 14. The database 14 is preferably updated when the processing variable V is within, particularly corresponding to, the tolerance range Tb. If the standard database is used initially, for example, the tolerance range Tb thereof is designed very generously, i.e. very wide, with this database, a preselection of the processing steps can be made that can be considered for updating the database. If the yield E1 for example, as is represented in FIG. 2, is within the tolerance range Tb1 (from the standard database), then this yield E1 is initially reliable. For updating, the corresponding tolerance range Tb can be correspondingly reduced so that the database 14 is optimized in this respect. If in contrast, the yields, as for example yield E2, are outside of the tolerance range, here the tolerance range Tb2, many times, this could be an indication that the associated tolerance range Tb2 was selected, or respectively specified too small, and/or incorrectly. Updating can be advantageous in this case, too. Therefore, it can be provided that updating the database 14 occurs when the tolerance variable T is outside of the tolerance range Tb.

The same applies correspondingly for the one-sided range limits, thus the lower tolerance value Tu, or respectively the upper tolerance value To. Here too, it can be advantageous to update the database 14, when the processing parameter V is less than the upper tolerance value To, when the processing parameter V is greater than the upper tolerance value To, when the processing parameter V is greater than the lower tolerance value Tu, or when the processing parameter V is less than the lower tolerance value Tu.

Depending on the intended application and/or the frequency of deviating results, it can be necessary and/or expedient to update the database 14.

An advantageous embodiment of the invention is characterized in that a plurality of meat processing machines is monitored, in particular simultaneously. This monitoring can be performed machine-individually and/or for all machines in general. In particular for the general machine monitoring, it can be provided that the processing variables of at least substantially the same, corresponding input meat products are compared. If a large deviation, i.e. in particular greater than (or equal to) 5%, is found, no update is carried out or the detected variables are disregarded when the update is carried out. If a very small deviation, i.e. particularly less than 5%, it is determined, the average of the respective variables, in particular the related processing variables, is considered when the update is carried out.

A further advantageous embodiment of the invention is characterized in that an update is carried out dependent on the transport time and/or the transport path of the input meat product. Thus, for example, a lower yield is to be expected with a longer transport time and/or a longer transport path. Preferably, the transport time and/or transport path are considered as a linear factor in determining the tolerance variable.

In principle, standard databases 14 can be predetermined for a plurality of meat types and/or categories. However, it has been shown in practice that different boundary conditions of the animal breeding and/or rearing influence the results of the meat processing. Thus, the same fish can have different body shapes due to different feed conditions and/or different water temperatures.

To address these often very different context conditions also with regard to a possible reliable determination of the size tolerance variable, further advantageous embodiments of the invention can be contemplated, which are explained below. It can thus be provided, for example, that an update of the database can take place depending on the season and/or on the place, namely the place of capturing the animal and/or the slaughtering of the animal and/or the processing of the animal, respectively. For this purpose, adapted records can be provided to update the database. Furthermore, it can be provided that an update of the database takes place depending on the feeding of animal to be processed, in particular on its food, feeding place and/or feeding times. Thus, respective corresponding records may be provided for different feedings in order to update the database.

For dealing with the aforementioned plurality of animal shapes and/or input meat products 8, in additional and/or alternatively a setup mode for the meat processing machine 2 has proven to be advantageous. A preferred design of the method according to the invention therefore comprises a setup mode of the meat processing machine 2 with the steps: newly setting the database parameters with at least one preset sample parameter data set, and/or feeding reference meat products as input meat products 8 to the meat processing unit 4. The newly set database 14 with the at least one sample parameter dataset can correspond for example to the previously named standard database 14. However, it is also possible that at least one different sample parameter data set is used, in order to generate the values of the database. It is also conceivable that the sample parameter data set represents an empty set. The reference meat products can be distinguished in that they represent a plurality of different input meat products 8, in order to be able update the database 14 with as broad a range as possible. Because the supply of the reference meat products, the previously explained determination of a database parameter set comprising the input product data L, the machine parameters and/or the tolerance variable T, can similarly comprise an updating of the database 14 with the previously determined data parameter set. In other words, the database 14 can be updated by the reference meat products directed towards the anticipated input meat products 8.

A further advantageous design of the method is distinguished by registering, in each case, the fed input meat product 8 when the input meat product data L thereof is outside of a preset product tolerance range Pe for the input meat products 8 to be fed. It is known for example, that the meat processing unit 4 can process input meat products 8 up to a width of 6 cm, so for an input meat product 8 with a width of 8 cm it is to be expected that the processing by means of the meat processing unit 4 will not proceed without errors. This information is already known before the actual processing by the meat processing unit 4. Registering such an input meat product 8 is advantageous for using the information advantageously in the further method. A further preferred design of the method is distinguished by registering, in each case, the output meat product 16 fed out, if the output product data G thereof is outside of a preset product tolerance range Pa for output meat products 16 to be fed out. If it is known, for example, that the blades of the meat processing unit 4 for cutting the fillets can be driven to such a small separation distance that the fillets have at least a width of 3 cm, and if the output sensor unit 18 acquires such a fillet having a width of 2 cm as an output meat product 16, then it is to be assumed that the processing here was not without errors. This information can be advantageous for the further method.

On the basis of the previous named designs, this registration of an input meat product 8 and/or an output meat product 16 allows the boundary conditions of the meat processing unit 4 to be evaluated in comparison to the meat products 8, 16. It is therefore preferable to issue a warning signal and/or status signal for a registered input and/or output meat product 8, 16 by means of a preset designation, preferably by means of an optical and/or acoustic output unit 20. The designation can be designed on an individual registration basis.

As explained previously, the registration indicates, particularly for the respectively fed input meat product 8, that the processing by means of the meat processing unit 4, has errors and/or can have errors. Therefore, it is preferably provided that database parameter set associated with the registered input meat product 8 is not considered when updating the database 14. Alternatively or additionally it can be provided that a database parameter set associated with the registered output meat product 16 is not considered when updating the database 14. Thus, it can be prevented in a particularly simple and effective manner that the database is updated and/or degraded by erroneous and/or disadvantageous database parameter sets.

Furthermore, according to the invention a meat processing machine 2 for processing meat is provided with a meat processing unit 4 for processing input meat products 8 fed thereto, an input sensor unit 10, and a control unit 12 for controlling the meat processing unit 4, where the control unit 12 is connected to the input sensor unit 10, and wherein the meat processing machine 2 is equipped and/or designed to perform the method according to one of the previously named, particularly advantageous, designs.

The invention claimed is:

1. A method for monitoring a meat processing machine with
   (a) a meat processing unit for processing input meat products fed thereto into output meat products,
   (b) an input sensor unit, and
   (c) a control unit for controlling the meat processing unit, wherein the control unit is connected to the input sensor unit, comprising the steps:
   (d) feeding input meat products to the meat processing unit,
   (e) acquiring input product data of the input meat products fed to the meat processing unit by the input sensor unit, wherein the input product data further consists of geometric data and/or weight data, and (f) determining a tolerance variable for a yield-relevant processing parameter by a mathematical model or a database, in each case depending on the acquired input product data.

2. The method according to claim 1, characterized in that the processing parameter is the yield of the processing.

3. The method according to claim 1, characterized in that a tolerance range, an upper tolerance value and/or a lower tolerance value is determined as the tolerance variable for the processing parameter.

4. The method according to claim 1, characterized in that the method steps for the input meat products fed to the meat processing unit are performed on a random basis or periodically with a predefined periodicity.

5. The method according to claim 1, characterized in that (a) the tolerance variable is assigned at least one value from the database depending on the input product data or the input product data and machine parameters, (b) wherein tolerance variables are stored by the database depending on input product data or input product data and machine parameters.

6. The method according to claim 1, characterized in that the tolerance variable is calculated (a) from the input product data by a morphology model as the mathematical model, or (b) from the input product data and machine parameters by a morphology model and a machine model together as the mathematical model.

7. The method according to claim 1, characterized by the steps:

(a) tracking input meat products, (b) acquiring output product data by an output sensor unit of the meat processing machine, in particular geometric data and/or weight data of the corresponding, particularly yield-relevant, output meat product fed out of the meat processing unit, wherein the control unit is connected to the output sensor unit, and (c) determining the yield-relevant processing parameter depending on the input product data and the output product data corresponding thereto, in particular by calculating the difference or calculating the ratio.

8. The method according to claim 7, characterized by issuing (a) a warning signal by an acoustic and/or optical output unit if the determined processing parameter is outside of the tolerance range, and/or (b) a status signal by an acoustic and/or optical output unit if the determined processing parameter is within the tolerance range.

9. The method according to claim 8, characterized in that the value of the status signal is set depending on a deviation between the determined processing parameter and one of the range limits of the tolerance range.

10. The method according to claim 7, characterized by the steps:

(a) pecifying a tolerance variable for the processing parameter corresponding to the acquired input product data, or determining the tolerance variable by the processing parameter corresponding to the acquired input product data, (b) determining a database parameter set comprising the input product data, the tolerance variable for the associated processing parameter and/or the machine parameters, and (c) updating the database with the database parameter set.

11. The method according to claim 10, characterized in that the database is updated (a) when the processing parameter is outside of or within the tolerance range, or (b) when the processing parameter is less than or greater than the upper tolerance value, or (c) when the processing parameter is less than or greater than the lower tolerance value.

12. The method according to claim 10, characterized by a setup mode of the meat processing machine comprising the steps:

(a) newly setting the database parameter with a preset sample parameter dataset, and (b) feeding reference meat products as input meat products to the meat processing unit.

13. The method according to claim 1, characterized by registering each fed input meat product, whose input product data is outside of a predetermined product data tolerance range for input meat products to be fed.

14. The method according to claim 1, characterized by registering each output meat product fed out, whose output product data is outside of a predetermined product tolerance range for output meat products to be fed out.

15. The method according to claim 13, characterized in that the warning signal and/or status signal for a registered input meat product and/or output meat product is issued with a pre-determined identification.

16. The method according to claim 13, characterized in that a database parameter set belonging to the registered input meat product is disregarded when updating the database.

17. A meat processing machine for meat processing with (a) a meat processing unit for processing input meat products fed thereto into output meat products, (b) an input sensor unit, and (c) a control unit for controlling the meat processing unit, wherein the control unit is connected to the input sensor unit, characterized in that (d) the meat processing machine is equipped and/or designed for performing the method according to claim 1.

* * * * *